(12) United States Patent
Okamoto et al.

(10) Patent No.: US 11,883,991 B2
(45) Date of Patent: Jan. 30, 2024

(54) CONTROL DEVICE OF INJECTION MOLDING MACHINE AND METHOD OF SETTING MOLD CLAMPING FORCE

(71) Applicant: UBE MACHINERY CORPORATION, LTD., Ube (JP)

(72) Inventors: Akio Okamoto, Ube (JP); Yuuichirou Arima, Ube (JP); Kazuaki Miyamoto, Ube (JP); Yuuichirou Fukuda, Ube (JP); Fumihiko Shimizu, Ube (JP)

(73) Assignee: UBE MACHINERY CORPORATION, LTD., Ube (JP)

( * ) Notice: Subject to any disclaimer, the term of this patent is extended or adjusted under 35 U.S.C. 154(b) by 35 days.

(21) Appl. No.: 17/624,756

(22) PCT Filed: May 8, 2020

(86) PCT No.: PCT/JP2020/018614
§ 371 (c)(1),
(2) Date: Jan. 4, 2022

(87) PCT Pub. No.: WO2021/014715
PCT Pub. Date: Jan. 28, 2021

(65) Prior Publication Data
US 2022/0250299 A1 Aug. 11, 2022

(30) Foreign Application Priority Data
Jul. 25, 2019 (JP) ................. 2019-136571

(51) Int. Cl.
*B29C 45/76* (2006.01)
*B29C 45/17* (2006.01)
(Continued)

(52) U.S. Cl.
CPC ...... *B29C 45/7653* (2013.01); *B29C 45/1774* (2013.01); *B29C 45/80* (2013.01);
(Continued)

(58) Field of Classification Search
CPC .......... B29C 2945/76187; B29C 2945/76505; B29C 2945/76705; B29C 45/1774;
(Continued)

(56) References Cited

U.S. PATENT DOCUMENTS

| | | | |
|---|---|---|---|
| 5,756,019 A | 5/1998 | Nakazawa et al. | |
| 2004/0081717 A1* | 4/2004 | Marazita | ............. B29C 45/7653 425/557 |

(Continued)

FOREIGN PATENT DOCUMENTS

| | | |
|---|---|---|
| CN | 103921417 A | 7/2014 |
| JP | H08-252849 A | 10/1996 |

(Continued)

OTHER PUBLICATIONS

Dec. 27, 2022 Office Action issued in Japanese Patent Application No. 2019-136571.

(Continued)

*Primary Examiner* — Kidest Bahta
(74) *Attorney, Agent, or Firm* — Oliff PLC (57) ABSTRACT

A control device of an injection molding machine, the injection molding machine including: a mold clamping device that advances and retracts a movable mold with respect to a fixed mold; and an injection device that injects and fills a molten material into a cavity formed between both the molds, the control device including: a display unit that displays a setting screen for setting molding conditions of (Continued)

the injection molding machine; and a setting unit that sets the molding conditions based on information displayed on the setting screen.

11 Claims, 4 Drawing Sheets

(51) Int. Cl.
    *B29C 45/80*           (2006.01)
    *G05B 19/402*         (2006.01)

(52) U.S. Cl.
    CPC .. *G05B 19/402* (2013.01); *B29C 2945/76083* (2013.01); *B29C 2945/76187* (2013.01); *B29C 2945/76505* (2013.01); *B29C 2945/76705* (2013.01); *G05B 2219/45244* (2013.01)

(58) Field of Classification Search
    CPC ... B29C 45/7653; B29C 45/80; G05B 19/402; G05B 19/409; G05B 2219/45244; G05B 19/00; G05B 15/00; G05B 2219/00; G05B 23/00
    See application file for complete search history.

(56) References Cited

U.S. PATENT DOCUMENTS

| | | | |
|---|---|---|---|
| 2013/0103184 A1* | 4/2013 | Morikawa | B29C 45/766 700/197 |
| 2013/0142899 A1* | 6/2013 | Murata | B29C 45/766 425/150 |
| 2015/0197052 A1* | 7/2015 | Hirose | B29C 45/7653 264/40.5 |
| 2017/0001354 A1* | 1/2017 | Nobuta | B29C 45/76 |

FOREIGN PATENT DOCUMENTS

| | | |
|---|---|---|
| JP | 2005-096295 A | 4/2005 |
| JP | 2008-126557 A | 6/2008 |
| JP | 2014-136323 A | 7/2014 |
| JP | 2017-039235 A | 2/2017 |

OTHER PUBLICATIONS

Jul. 7, 2020 International Search Report issued in International Patent Application No. PCT/JP2020/018614.

* cited by examiner

| | | | Mold Clamping Force (kN) | Speed (mm/s) | Screw Position (mm) |
|---|---|---|---|---|---|
| (S) | Injection Start | | A | 57.5 | 600.00 |
| (1) | Injection | | A | 57.5 | 525.00 |
| (2) | | | B | 57.5 | 520.00 |
| (3) | | | B | 57.5 | 515.00 |
| (4) | | | C | 57.5 | 510.00 |
| (5) | | | C | 57.5 | 505.00 |
| (E) | VP to Pressure-Keeping | | M | 57.5 | 25.00 |

MENU | First Molding | Name of Molded Article | 10 | DATA SAVING

First Molding

Compression Condition — Screw Position (mm)
Screw Position | 0.00

FIG.5

CONTROL DEVICE OF INJECTION MOLDING MACHINE AND METHOD OF SETTING MOLD CLAMPING FORCE

TECHNICAL FIELD

The present invention relates to a control device of an injection molding machine and a method of setting a mold clamping force.

BACKGROUND ART

In injection molding by an injection molding machine, first, in an injection device, a molten material that has been melted is stored in a storage portion forward of a screw to undergo measurement. Then, when molten material required for one time of injection-and-filling has been stored in the storage portion and measurement completed, the screw is advanced from a measurement completion position to a VP switching position at a certain injection speed. As a result, the molten material stored within the storage portion is injected and filled into a cavity of a mold.

At this time, due to being pressed by the molten material flowing within the cavity, various kinds of gases of the likes of air within the cavity or gas generated from the molten material flow within the cavity. Since such gases represent a cause of a defect being produced in a molded article, usually, injection molding is performed in such a manner that they are discharged from a mold mating surface (a PL surface). However, various contrivances to more positively encourage discharge of the gases are implemented too.

A well-known method is to start injection-and-filling into the cavity of the molten material in a state where the mold has been mold-clamped with a mold clamping force lower than a regular mold clamping force in the injection molding machine, for example. More specifically, there is a method where the PL surface of a fixed mold and a movable mold has a fine gap formed therein, injection and filling is started in a state of the movable mold being at a mold clamping mid-way position, the gases are discharged from the PL surface, and, at a stage when the screw has passed a certain position, mold clamping by a regular mold clamping force is started to complete the injection molding (refer to paragraphs [0036] and [0039], and so on, in the specification of below-listed Patent Document 1, for example).

PRIOR ART DOCUMENT

Patent Document

Patent Document 1: Japanese Laid-Open Patent Publication No. 2017-39235

SUMMARY OF THE INVENTION

Problem to be Solved by the Invention

However, in the method performed in the injection molding machine disclosed in above-described Patent Document 1, due to injection-and-filling being started and the gases within the cavity being discharged from a state mid-way in clamping of the mold having the fine gap formed in its PL surface, there is a possibility of resin burr being generated in the PL surface immediately after start of injection. Moreover, since mold clamping (lockup, maximum mold clamping force) is performed mid-way in the injection-and-filling, whereby the fine gap of the PL surface ends up being got rid of, and discharge of the gases from the PL surface ends up being stopped, there is a risk that discharge of the gases within the cavity in the course of the screw advancing from the measurement completion position to the VP switching position is not sufficiently performed. In this case, there is a problem of it becoming easier for a molding defect such as a sink mark or silver streak (silver stripe) to be generated in the molded article.

The present invention was made in view of the above-described circumstances, and has an object of providing a control device of an injection molding machine and a method of setting a mold clamping force in which discharge from a PL surface of a gas within a cavity is promoted to enable shortening of a molding cycle to be achieved and quality of a molded article to be improved while life of a mold is extended.

Means for Solving the Problem

A control device of an injection molding machine according to the present invention is a control device of an injection molding machine, the injection molding machine comprising: a mold clamping device that advances and retracts a movable mold with respect to a fixed mold; and an injection device that injects and fills a molten material into a cavity formed between both the molds, the control device comprising: a display unit that displays a setting screen for setting molding conditions of the injection molding machine; and a setting unit that sets the molding conditions based on information displayed on the setting screen, the setting screen having: a first display column that displays a plurality of screw positions from a measurement completion position of a screw of the injection device to a VP switching position of the screw of the injection device; and a second display column that displays mold clamping forces generated by the mold clamping device in such a manner that the mold clamping forces are associated with the plurality of screw positions displayed in the first display column, and the setting unit setting the molding conditions in such a manner that each of the plurality of screw positions set from the measurement completion position to the VP switching position of the screw displayed in the first display column has associated with it the mold clamping force displayed in the second display column as a mold clamping force to be generated when the screw has reached the screw position.

In one embodiment of the present invention, the mold clamping force of the molding conditions is set so as to become larger stepwise from the measurement completion position to the VP switching position.

In another embodiment of the present invention, the setting unit sets the molding conditions in such a manner that the screw position set to the measurement completion position, of the plurality of screw positions has associated with it an initial mold clamping force of a start time of injection by the injection device.

In yet another embodiment of the present invention, the setting unit sets the molding conditions in such a manner that the screw position set to the VP switching position, of the plurality of screw positions has associated with it a mold clamping force for pressure-keeping by the injection device.

In yet another embodiment of the present invention, the setting screen has a third display column that displays a mold closing speed of the mold clamping device, and the setting unit sets the molding conditions in such a manner that each of the mold clamping forces respectively associated with the plurality of screw positions has associated with it the mold closing speed at a time when the mold clamping force thereof displayed in the third display column is generated.

In yet another embodiment of the present invention, the setting screen has a fourth display column that displays a real-time screw position of the screw.

In yet another embodiment of the present invention, the setting screen has a fifth display column that displays the screw position set to the VP switching position of the screw.

In yet another embodiment of the present invention, the control device of an injection molding machine comprises: an input unit that receives input of information to at least one of the first display column, the second display column, the third display column, and the fifth display column in the setting screen; and a control unit that controls operation of at least one of the mold clamping device and the injection device based on the molding conditions set by the setting unit.

A method of setting a mold clamping force according to the present invention is a method of setting a mold clamping force of a mold clamping device by a control device of an injection molding machine, the injection molding machine comprising: the mold clamping device that advances and retracts a movable mold with respect to a fixed mold; and an injection device that injects and fills a molten material into a cavity formed between both the molds, the control device having: a display unit that displays a setting screen for setting molding conditions of the injection molding machine; and a setting unit that sets the molding conditions based on information displayed on the setting screen, and the setting screen having: a first display column that displays a plurality of screw positions from a measurement completion position of a screw of the injection device to a VP switching position of the screw of the injection device; and a second display column that displays mold clamping forces generated by the mold clamping device in such a manner that the mold clamping forces are associated with the plurality of screw positions displayed in the first display column, the method of setting a mold clamping force including: (a) a first setting step in which the plurality of screw positions from the measurement completion position of the screw to the VP switching position of the screw are displayed in the first display column to be set; (b) a second setting step in which setting is performed in such a manner that a screw position that has been selected (in order from a measurement completion position side), of the plurality of screw positions that have been set has associated with it the mold clamping force displayed in the second display column; (c) an injection step in which mold clamping is performed with the mold clamping force that has been set, and the screw is advanced to the selected screw position from the measurement completion position to have the molten material filled into the cavity; and (d) a judgment receiving step in which a molded article that has been extracted from the cavity after the injection step receives a judgment result of presence/absence of a defect, a mold clamping force in the molding conditions being set by it being repeated for each of the plurality of screw positions that when a defect has been found to be present in the molded article in the judgment receiving step of above-described (d), the mold clamping force that is set associated with a screw position where a defect has been confirmed is displayed and reset increased over a time of defect confirmation in the second setting step of above-described (b), whereupon the injection step of above-described (c) and the judgment receiving step of above-described (d) are re-performed for the screw position where the defect has been confirmed.

In one embodiment of the present invention, a mold clamping force in the molding conditions is set by it being repeated for each of the plurality of screw positions that when a defect has not been found to be present in the molded article in the judgment receiving step of above-described (d), the mold clamping force that is set associated with a screw position where a defect has not been confirmed is displayed and set in the second setting step of above-described (b) with respect to a next screw position more to a VP switching position side than that screw position, whereupon the injection step of above-described (c) and the judgment receiving step of above-described (d) are performed for the next screw position.

In another embodiment of the present invention, the control device controls the mold clamping device and the injection device to automatically have performed as one cycle that in the first setting step of above-described (a), one screw position of the plurality of screw positions is displayed in the first display column to be set as the VP switching position, in the second setting step of above-described (b), the one screw position is set having associated with it the mold clamping force displayed in the second display column as a selected screw position, and in the injection step of above-described (c), the screw is advanced to the one screw position to have filling with the molten material performed.

Effect of the Invention

Due to the present invention, discharge from a PL surface of a gas within a cavity is promoted to enable shortening of a molding cycle to be achieved and quality of a molded article to be improved while life of a mold is extended.

EMBODIMENTS FOR CARRYING OUT THE INVENTION

A control device of an injection molding machine and a method of setting a mold clamping force according to an embodiment of the present invention will be described in detail below with reference to the accompanying drawings. However, the embodiment below does not limit the inventions according to each of the claims, moreover, not all of the combinations of features described in the embodiment are necessarily essential to the means for solving the problem of the invention.

Figure 1:
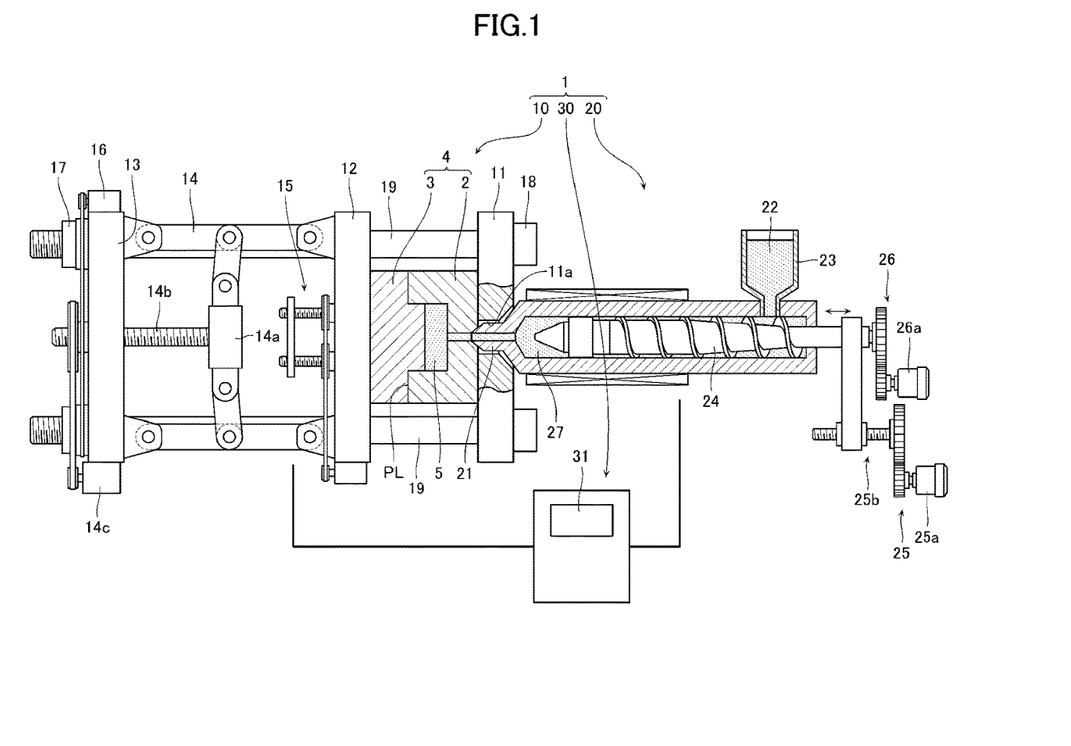
FIG. 1 is a diagram showing an outline of an injection molding machine comprising a control device according to one embodiment of the present invention.

As shown in FIG. 1, an injection molding machine 1 according to one embodiment of the present invention comprises a mold clamping device 10, an injection device 20, and a control device 30. The control device 30 controls operation of the mold clamping device 10 and the injection device 20 to perform overall control of the injection molding machine 1. Note that this injection molding machine 1 may be configured by a general injection molding machine, hence, below, explanation of already-known configurations will be confined to an outline, and details avoided.

The mold clamping device 10 of the injection molding machine 1 is configured from a general toggle-type mold clamping device, for example. The mold clamping device 10 comprises: a fixed platen 11, a movable platen 12, and a link housing 13 that are provided parallel to each other and arranged in a line in a mold opening/closing direction; and a toggle link mechanism 14 which is provided between the movable platen 12 and the link housing 13.

Moreover, the mold clamping device 10, which comprises: four tie bars 19 bridged from four corners of the fixed platen 11 penetrating four corners of the movable platen 12 and link housing 13; a product extruding device 15 mounted on the movable platen 12; and a driving device (not illustrated) that moves the link housing 13 in the mold opening/closing direction with respect to the fixed platen 11, is placed on an unillustrated base that has been installed on a floor surface, for example.

Note that the above-mentioned "mold opening/closing direction" refers to a direction that the movable platen 12 and link housing 13 approach and separate from the fixed platen 11, and refers to a direction that mold opening and mold closing are performed by a later-mentioned mold 4 configured from a fixed mold 2 of the fixed platen 11 and movable mold 3 of the movable platen 12.

The mold clamping device 10 drives the movable platen 12 in the mold opening/closing direction being an axial center direction of the plurality of tie bars 19 by bending and extension of the toggle link mechanism 14, and thereby performs a mold opening/closing operation and a mold clamping operation between the fixed mold 2 and the movable mold 3. Note that in FIG. 1, illustration of the tie bar 19 on the near side facing the paper surface disposed between the movable platen 12 and the link housing 13 is omitted.

The fixed platen 11 is fixed onto the base by a bolt, or the like. This fixed platen 11 has formed therein in its center portion a hole-for-injection 11a that may be inserted with a nozzle 21 for injection, of the injection device 20, for example. The fixed platen 11 and the movable platen 12, each of whose facing surfaces configure a mold mounting surface, have configured between them in a holdable manner the mold 4 that forms a cavity 5 by the fixed mold 2 and the movable mold 3.

In order for mold clamping to be performed by the mold clamping device 10 configured in this way, first, the fixed mold 2 and the movable mold 3 are mold-mated at a mold mating surface PL to perform mold closing. In the mold closing, a mold clamping motor 14c that imparts rotational drive to a screw shaft 14b coupled to a crosshead 14a of the toggle link mechanism 14 via an unillustrated nut is driven, and the crosshead 14a is moved in a mold closing direction (a mold clamping direction).

As a result, the toggle link mechanism 14 extends and the movable platen 12 is moved in the mold closing direction, so the movable mold 3 fixed to the movable platen 12 closely contacts the fixed mold 2 fixed to the fixed platen 11, whereby mold closing (mold mating) is performed. By mold closing being performed in this way, the cavity 5 is formed in the mold 4.

In order to impart a mold clamping force on both the molds 2, 3 that have been mold-mated in this way, the crosshead 14a is moved further in the mold clamping direction from a mold-mated state to completely extend the toggle link mechanism 14. During this period until the toggle link mechanism 14 is completely extended, the tie bar 19 whose both ends are fixed is extended within an elastic range, hence a stress generated in the tie bar 19 depending on an extension amount of the tie bar 19 acts as a mold clamping force on the mold 4 between the fixed platen 11 and the movable platen 12, via both the platens 11, 12. In this way, the mold clamping force is determined depending on the extension amount of the tie bar 19, hence, in order to adjust the mold clamping force, all that is required is to adjust a position in the mold opening/closing direction with respect to the fixed platen 11 of the link housing 13 in the above-mentioned mold-mated state.

Note that the tie bars 19 are fixed in a non-rotatable manner to the fixed platen 11 by fixing nuts 18, hence the position in the mold opening/closing direction of the link housing 13 is adjustable by drive nuts 17 that are supported in a rotatable manner by the link housing 13 and are disposed in each of the tie bars 19 and screwed onto screw-processed portions in rear end portions of the tie bars 19 being simultaneously rotationally driven by a motor 16 fixed to the link housing 13 via a rotation transmitting mechanism such as a die height gear or belt.

Then, in a state of the toggle link mechanism 14 having been completely extended after the link housing 13 has been retracted by this rotational drive of the drive nuts 17, the link housing 13 is advanced to mold-match the fixed mold 2 and the movable mold 3, and the toggle link mechanism 14 is further bent to move the movable platen 12 in a mold opening direction.

Subsequently, the link housing 13 is moved in the mold closing direction along with the movable platen 12 in a state of the toggle link mechanism 14 having been bent, substantially the same amount as an extension amount of the tie bar 19 that will generate a desired mold clamping force. This positional adjustment of the link housing 13 enables the desired mold clamping force to be generated by mold-matching the fixed mold 2 and the movable mold 3 in a state of the toggle link mechanism 14 not having being completely extended and then completely extending the toggle link mechanism 14. Thus, by performing a positional adjustment in the mold opening/closing direction of the link housing 13 not moved in a regular molding step, and thereby changing the extension amount of the tie bar 19 of the toggle link mechanism 14 in a completely extended state, the mold clamping force imparted to the mold 4 may be adjusted.

Note that in such a toggle-type mold clamping device 10, a generatable mold clamping force is adjusted by extension amount adjustment of the tie bars 19 accompanying positional adjustment of the link housing 13, hence, in order that extension amounts of each of the tie bars 19 will be the same during mold clamping, a configuration is adopted whereby the drive nuts 17 disposed in each of the tie bars 19 are simultaneously rotationally driven the same number of rotations by the motor 16.

On the other hand, the injection device 20 injects and fills a molten resin into the cavity 5 of the mold 4 formed by the fixed mold 2 and the movable mold 3. The injection device 20 comprises: a hopper 23 for storing and introducing into the injection machine 20 a pellet-like material-for-molding 22, for example; and a screw 24 that heats and melts the material-for-molding 22, compressing it and injecting and filling it through the nozzle 21 connected to an injection channel provided in the fixed mold 2 via the hole-for-injection 11a of the fixed platen 11.

In addition, the injection device 20 comprises: an injection mechanism 25 including an injection motor 25a that, combined with a rotation/linear-motion converting means 25b such as a ball screw mechanism, for example, moves the screw 24 in an injection direction (the mold opening/closing direction); and a rotation mechanism 26 including a rotating motor 26a that rotates the screw 24.

In this injection device 20, the material-for-molding 22 that has been introduced into the injection device 20 from the hopper 23 is conveyed in an injection port direction of the nozzle 21 by rotation of the screw 24, while being heated by a heater (not illustrated) on an outer peripheral surface side of the injection device 20. In that conveying process, the material-for-molding 22 is melted (plasticized) and compressed by heat of the heater and shearing heat due to contact with a helical blade of the screw 24.

Then, in a measurement step of the injection device 20, the melted material-for-molding 22 is stored in a storage portion 27 formed in a forward portion on a fixed mold 2 side of the screw 24, and the screw 24 retracts due to an amount stored in the storage portion 27 of the material-for-molding 22 increasing. At this time, a certain retraction resistance (back pressure) is generated in the screw 24 by the injection motor 25a of the injection mechanism 25, thereby enabling the melted material-for-molding 22 to be stored in the storage portion 27 at a certain pressure.

Next, in an injection-and-filling step of the injection device 20, when an amount required for injection-and-filling of the material-for-molding 22 is stored in the storage portion 27, rotation of the screw 24 is stopped, after which the injection motor 25a of the injection mechanism 25 is driven to advance the screw 24 in the injection direction. Due to this injection advancing operation of the screw 24, the melted material-for-molding 22 of the storage portion 27 is extruded into the injection channel of the fixed mold 2 via the nozzle 21, and proceeds to be filled into the cavity 5 of the mold 4.

In this injection-and-filling step, the injection advancing operation of the screw 24 of the injection device 20 results in the material-for-molding 22 proceeding to be filled in in a state of a certain pressure having been imparted to inside the cavity 5 of the mold 4. Then, due to an increase in filled amount of the material-for-molding 22 filled into the cavity 5, in other words, due to an expansion of projected area in the mold opening/closing direction of the material-for-molding 22 that has been filled into the cavity 5 (hereafter, called "injected-and-filled area"), a mold opening force, which is expressed by a product of said injected-and-filled area and a certain pressure imparted to the material-for-molding 22 (a molding resin pressure) and which causes the movable mold 3 to separate from the fixed mold 2, increases. As a result, a maximum mold opening force is generated at a timepoint when the material-for-molding 22 fills the inside of the cavity 5, that is, at a timepoint of completion of the injection-and-filling step (a timepoint when the screw 24 has reached the VP switching position). Hence, the mold clamping device 10 of the injection molding machine 1 is designed so that a maximum clamping force sufficiently able to counter the maximum mold opening force supposed in this injection-and-filling step is imparted in a maintainable manner to the mold 4.

However, if the mold 4 injected and filled with the material-for-molding 22 is acted on by the just-described maximum mold clamping force from start to completion of the injection-and-filling step, a degree of close-contact of the mold mating surface PL of the mold 4 will rise, and the cavity 5 will attain a substantially airtight state where it is difficult for air in the cavity 5 or gas generated from the molten (plasticized) state material-for-molding 22 to be discharged from the mold mating surface PC. Even in this state, these air or gas pressed by the filled-in material-for-molding 22 have to be discharged from the mold mating surface PL. Therefore, when discharge from the mold mating surface PL of the air or gas are insufficient, it results in the air or gas that have not been discharged from inside the cavity 5 being compressed and left inside the cavity 5.

As a result, it becomes easier for the air or gas that has been compressed and left inside the cavity 5 to be incorporated into the molded article to become a void and product strength to fall, or for the air or gas to be a cause of a transfer defect of a design pattern that ought to be formed on the molded article surface, or for there to be generated a defect such as a silver streak (a silver stripe). Moreover, in a mode where there is disposed in the mold 4 a configuration promoting gas discharge within the cavity 5 referred to as a degassing groove, or the like, other than the mold mating surface PL, compression deformation in the mold opening/closing direction of the mold 4 due to the maximum mold clamping force, and so on, results in same degassing groove, or the like, being crushed or deformed so that its cross-sectional area decreases, and in discharge of the gas being unstable. On the other hand, in a mode where there is provided a configuration promoting gas discharge in a region other than a product design surface, not only is discharge of gas left in the product design surface difficult, but molten resin included in the discharged gas is filled also into a portion of same configuration of gas discharge so that discharge of gas becomes extremely unstable due to clogging of same configuration portion, or highly frequent maintenance of the mold 4 such as cleaning becomes required.

Accordingly, in order to promote discharge of gas from the mold mating surface PL in the injection-and-filling step, the injection molding machine 1 according to the present embodiment has been configured to perform injection molding by increasing the mold clamping force due to the mold clamping device 10 stepwise correspondingly to screw positions during the injection advancing operation of the screw 24 of the injection device 20, by control of the control device 30.

As a result, it becomes possible for gas within the cavity 5 to be efficiently and effectively discharged, so life of the mold 4 of the injection molding machine 1 can be extended, and it becomes possible too for shortening of a molding cycle accompanying shortening of cooling time, and so on, to be achieved. Hence, betterment and improvement in quality of the molded article manufactured by the injection molding machine 1 can be achieved.

Figure 2:
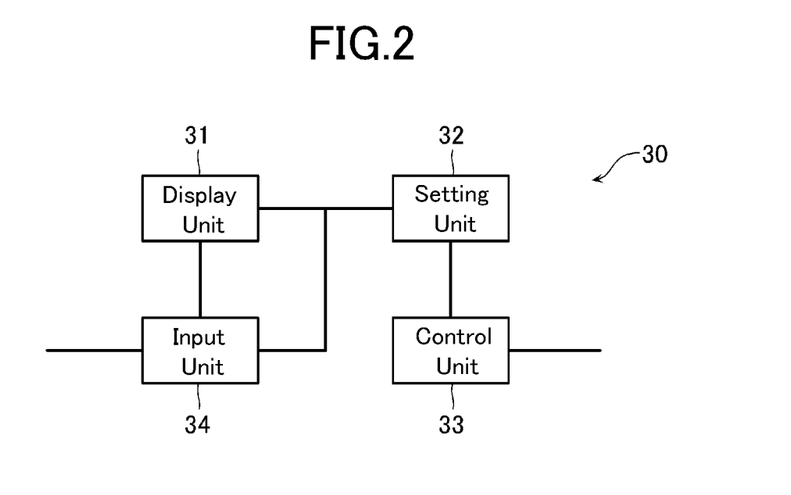
FIG. 2 is a diagram showing an outline of functional configuration of same control device.

Note that the mold clamping device 10, which comprises an unillustrated mold clamping force detecting means such as a load cell, is configured to enable detection of the mold clamping force imparted to the mold 4, and the control device 30 is configured to enable setting of molding conditions including mold clamping conditions defining the mold clamping force to be generated by this mold clamping device 10 and injection conditions to be performed by the injection device 20. As shown in FIG. 2, the control device 30 functionally comprises a display unit 31, a setting unit 32, a control unit 33, and an input unit 34, for example.

The display unit 31, which comprises a displaying means such as a display device, displays information required in the injection molding machine 1, and displays a condition setting screen 35 (refer to FIG. 4; the same applies hereafter) for setting the molding conditions of the injection molding machine 1. The setting unit 32 sets the molding conditions based on various kinds of information displayed on the condition setting screen 35.

Moreover, the control unit 33 controls operation of the mold clamping device 10 and the injection device 20 based on the molding conditions that have been set by the setting unit 32. The control unit 33 has a storing means (not illustrated) enabling various kinds of information or molding conditions to be stored. The input unit 34 receives input of various kinds of information inputted by operation to the control device 30 by a user using the likes of a touch panel, keyboard, or mouse, for example, or input of various kinds of information transmitted from outside. The input unit 34 also receives input of information such as alphanumeric characters to be displayed on the condition setting screen 35.

Now, setting of the mold clamping conditions of the mold clamping device 10, for example, of setting of the molding conditions by the control device 30 is performed as follows.

Figure 3:
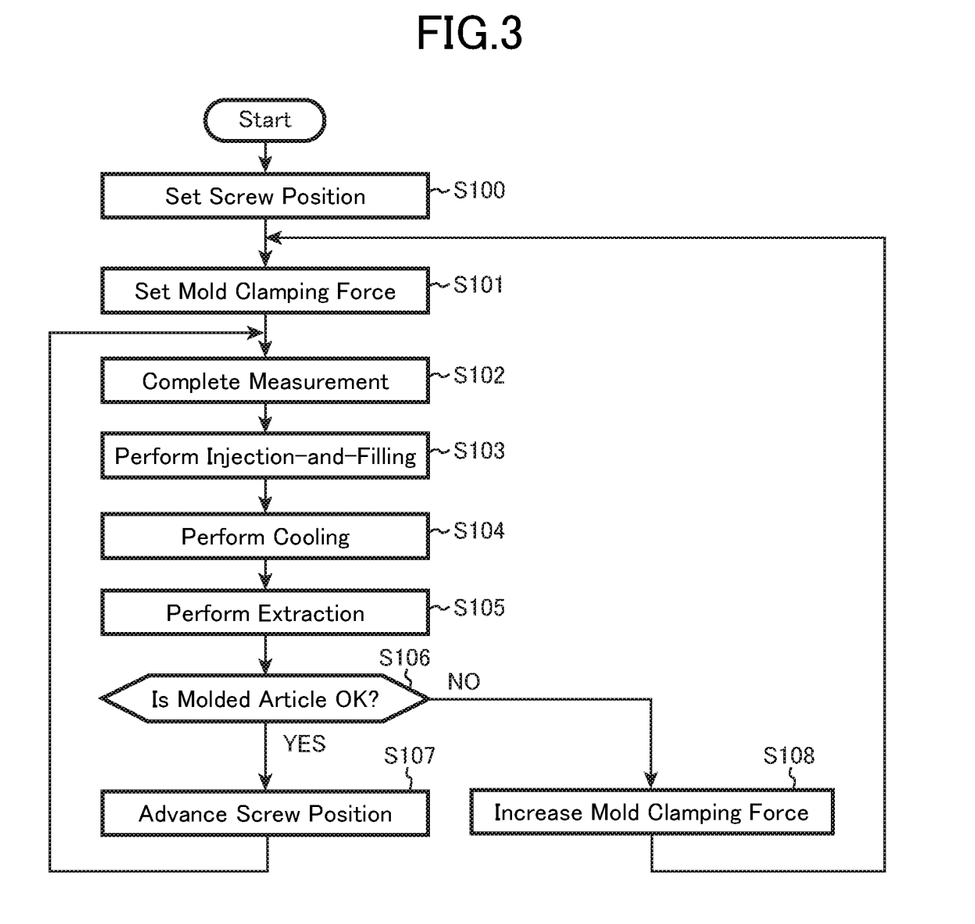
FIG. 3 is a flowchart for explaining setting steps of a mold clamping force by same control device.

As shown in FIG. 3, first, the user sets a plurality of screw positions for screw positions between from the measurement completion position to the VP switching position of the screw 24 of the injection device 20 (step S100: first setting step). Setting of the plurality of screw positions in this step S100 is performed using the condition setting screen 35 displayed in the display unit 31 of the control device 30, for example. In the present embodiment, the display unit 31 is configured by a touch panel enabling display and input of various kinds of information, and the condition setting screen 35 too is assumed to be one of screens to be selectively displayed on same touch panel.

Figure 4:
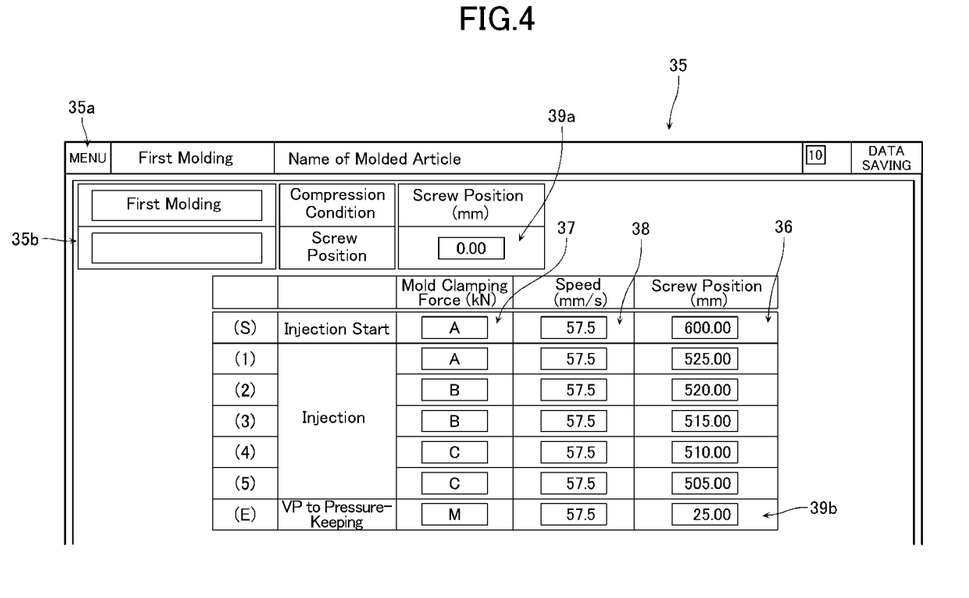
FIG. 4 is an explanatory diagram showing an outline of a setting screen displayed in a display unit of same control device.

As shown in FIG. 4, the condition setting screen 35 has: a menu bar 35a that displays information relating to the likes of a title of a molding condition or name of a molded article being manufactured, for example; and a molding display column 35b that displays information relating to a molding method or molding content. In addition, the condition setting screen 35 has: a screw position display column (a first display column) 36 that displays the plurality of screw positions between from the measurement completion position to the VP switching position of the screw 24 of the injection device 20, as mentioned above; and a mold clamping force display column (a second display column) 37 that displays the mold clamping forces generated by the mold clamping device 10 in such a manner that the mold clamping forces are associated with the plurality of screw positions displayed in the screw position display column 36.

Furthermore, the condition setting screen 35 has: a mold closing speed display column (a third display column) 38 that displays a mold closing speed of the mold clamping device 10; a real-time position display column (a fourth display column) 39a that displays a real-time screw position of the screw 24; and a VP switching position display column (a fifth display column) 39b that displays a screw position set to the VP switching position of the screw 24.

Note that the mold closing speed displayed in the mold closing speed display column 38 is information required when changing (boosting) the mold clamping force of the mold clamping device 10. In the example shown in FIG. 4, the mold closing speed display column 38 displays 57.5 (mm/s), for example. Now, the mold closing speed substantively corresponds to an advancing speed of the crosshead 14a of the toggle-type mold clamping device 10.

Note that in the present embodiment, the toggle-type mold clamping device 10 has been described. However, in a direct pressure-type mold clamping device or other form of mold clamping device too, setting of the mold closing speed is required when performing control to increase the mold clamping force in the injection-and-filling step. That is, there are no restrictions on carrying out the invention of the present application, even in an injection molding machine having a mold clamping device of a form other than that of a toggle-type mold clamping device.

Moreover, in order to boost the mold clamping force of the mold clamping device 10, there is a need for the crosshead 14a to be advanced to expand the tie bars 19 in proportion to a desired mold clamping force as mentioned above, so in order for this boosting to be performed in a timely manner at a certain specific timing during advancement (during speed control) of the screw 24, there is a need for the crosshead 14a to be advanced at a speed which is to a certain extend fast, and the mold clamping speed is an item set for that reason.

In step S100, the user inputs information such as numerical values and characters (hereafter, written as "input information") expressing an arbitrary screw position to the screw position display column 36 of the condition setting screen 35, via the input unit 34. As previously described, in the present embodiment, the display unit 31 is configured by a touch panel. This makes possible direct input from a display portion of each input information displayed on the condition setting screen 35 shown in FIG. 4. In the case of inputting numerical values, a configuration may be adopted such that, upon touching each display portion, a ten-key pad (not illustrated) or the like is displayed on same screen, and the numerical values can be inputted from same ten-key pad or the like. The same applies also to input of the screw position display column 36. In the example shown in FIG. 4, in the case that, for example, the measurement completion position of the screw 24 has been set to 600 mm and a maximum advancement position of the screw 24 has been set to 0 mm, the input information is inputted and displayed in the screw position display column 36 in such a manner that 600 (mm: hereafter, unit of position will likewise always be "mm") is inputted and displayed as injection start screw position (S) (the measurement completion position), 525 is inputted and displayed for screw position (1), 520 is inputted and displayed for screw position (2), 515 is inputted and displayed for screw position (3), 510 is inputted and displayed for screw position (4), and 505 is inputted and displayed for screw position (5).

That is, the screw position display column 36 has displayed therein the screw positions (1)-(5) indicating the plurality of screw positions determined in order from a measurement completion position side to the VP switching position of the screw 24. The setting unit 32 sets as a plurality of arbitrary screw positions between from the measurement completion position to the VP switching position the plurality of screw positions indicated by the input information that has been thus inputted and displayed in the screw position display 36. Note that there is no particular restriction on the screw positions set, provided they are between from the measurement completion position to the VP switching position of the screw 24. However, as previously described, the mold opening force increases due to expansion of the injected-and-filled area accompanying the injection advancing operation of the screw 24 from the measurement completion position to the VP switching position. Therefore, there may be adopted a configuration where analysis of filling behavior of the molten resin into the cavity 5 of the mold 4 by resin flow analysis software, or the like, is used to grasp in advance a filled resin amount by which a certain mold opening force will be generated due to the likes of shape of the cavity 5 (for example, there being included a flat plate-like portion, and so on) or a region where resin flow cross-sectional area within the cavity 5 is lower than in another region, and to grasp in advance a screw position advanced from the measurement completion position corresponding to said filled resin amount, and set a screw position based on the grasped-in-advance screw position, even in a short shot state prior to a fully packed state.

On the other hand, in the present embodiment, there is described a mode where suitable mold clamping forces are set associated with screw positions during the injection advancing operation of the screw 24 from the measurement completion position to the VP switching position. However, unlike in this mode, attention may be focused on screw advancing operation time during the injection advancing operation of the screw 24 from the measurement completion position to the VP switching position. That is, operational advantages of the invention of the present application can be displayed even by a mode where an injection advancing operation start time of the screw 24 from the measurement completion position is assumed to be 0 (zero), a VP switching position reaching time of the screw 24 is assumed to be an injection advancing operation completion time of the screw 24, and a plurality of screw reaching times from these injection advancing operation start time to injection advancing operation completion time of the screw 24 are displayed and set so that suitable mold clamping forces are set associated with these plurality of screw reaching times.

Note that the VP switching position display column 39b is inputted with a numerical value expressing the VP switching position. In the example shown in FIG. 4, the VP switching position display column 39b has input information of 25 inputted in the VP switching position (E), so a position indicated by this displayed input information is automatically set as the VP switching position (E) by the setting unit 32. Now, in a mode where the measurement completion position or VP switching position of the screw 24 are inputted as basic input information by, for example, an injection condition setting screen or molding condition setting screen for actual production, separate from the condition setting screen 35, a configuration may be adopted whereby the measurement completion position and VP switching position of the screw 24 that have been inputted by these setting screens are read from the setting unit 32 to be displayed in the uppermost row (S) of the screw position display column 36 and in the VP switching position display column 39b.

Upon the plurality of screw positions being thus set in step S100, next, in an initial time of setting, the user inputs input information expressing the mold clamping force corresponding to the measurement completion position (the screw position (S)) in the mold clamping force display column 37 of the condition setting screen 35, via the input unit 34, and an initial mold clamping force in the mold clamping device 10 is set (step S101: second setting step). The mold clamping force display column 37 too, similarly to the screw position display column 36, allows direct input from each display portion displayed on the condition setting screen 35.

Here, input information expressing an arbitrary initial mold clamping force at the screw position (S) when injection is started of the screw 24, is inputted and displayed in the mold clamping force display column 37 corresponding to the screw position (S). Along with this, input information expressing same mold clamping force is inputted and displayed automatically associated with the screw position (1), by the setting unit 32, for example. In the example shown in FIG. 4, in the case of the mold clamping force at the measurement completion position (the screw position (S)) of the screw 24 having been inputted as A, for example, the mold clamping force at the screw position (1) is also inputted and displayed associated with A.

Now, as previously described, the mold clamping force in the case of the material-for-molding 22 being molten resin, for example, can be obtained by the projected area of resin flow, that is, by injected-and-filled area×molding resin pressure, and, specifically, can be obtained by the following expression (1).

$$F \geq p \times A/100 \quad (1)$$

F: required mold clamping force (tf)
p: pressure within cavity (molding resin pressure) (kgf/cm$^2$)
A: total of projected area (injected-and-filled area) (cm$^2$)

Moreover, a maximum mold clamping force M due to the mold clamping device 10 can be obtained by the injected-and-filled area at a time of injection-and-filling completion, in other words, byproduct projected area×molding resin pressure. On the other hand, the above-mentioned initial mold clamping force A should be set smaller than this maximum mold clamping force M (mold clamping force zero<mold clamping force A<mold clamping force M). To give one example of the initial mold clamping force A, an adjustment pressure during mold production by a mating jig (not illustrated) used by a mold maker, or the like, manufacturing the mold 4, is preferably set as the mold clamping force A. By such an initial mold clamping force A being caused to act on the mold 4, a state of the mold mating surfaces PL being accurately and uniformly in contact that the mold maker, or the like, intended during mold production, is replicated, and generation of resin burr suppressed, while discharge of air or gas within the cavity 5 will be in a permissible mold clamping state.

Figure 5:
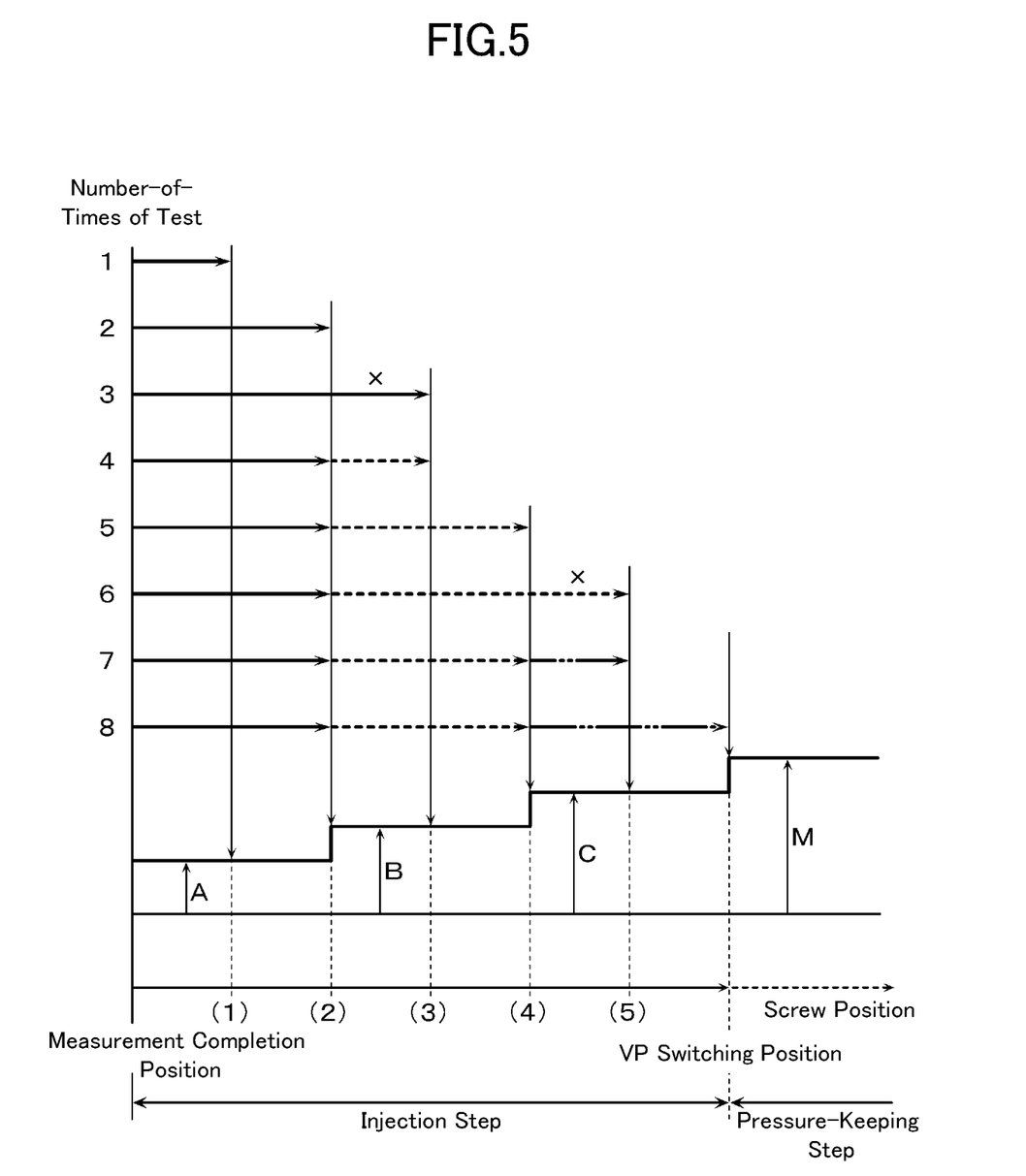
FIG. 5 is an explanatory diagram for explaining same setting steps of the mold clamping force.

As shown in FIG. 5, when the initial mold clamping force A has been set in step S101, first, in order to perform a first time of a test injection step, the screw 24 is retracted to the measurement completion position (the screw position (S)), whereby the material-for-molding 22 is stored in the storage portion 27, and measurement thereby completed (step S102).

Then, in a state of the mold 4 having been mold-clamped with the mold clamping force A displayed and set in the mold clamping force display column 37, injection-and-filling is performed in a short shot from the screw position (S) being the measurement completion position to the screw position (1) (step S103), pressure-keeping and cooling are performed (step S104), and mold opening is performed to extract the molded article (step S105). These steps S102-S105 represent the test injection step. Note that a short shot refers to injection-and-filling where molten resin in an amount not completely filling the inside of the cavity 5 is injected and filled into the cavity 5, whereas injection-and-filling where molten resin in an amount completely filling the inside of the cavity 5 is injected and filled into the cavity 5 is called full packing.

The method of setting a mold clamping force according to the present embodiment is a method in which such a test injection step is repeated to derive by trial-and-error the screw positions during the injection advancing operation of the screw 24, that is, appropriate mold clamping forces corresponding to the mold opening forces generated in the mold 4 by injected-and-filled area×molding resin pressure. Moreover, it is a method in which each of the screw positions (1)-(5) that have been set between the measurement completion position and the VP switching position displayed in the screw position display column 36 of the condition setting screen 35 has associated with it the mold clamping force that has been derived to be displayed in the mold clamping force display column 37 as a mold clamping force to be caused to act on the mold 4 when the screw 24 has reached each screw position (1)-(5), and these appropriate mold clamping forces corresponding to the screw positions during the injection advancing operation of the screw 24 are set as the mold clamping conditions.

Note that at a start time of this test injection step, the screw position displayed in the real-time position display column 39a will be displayed as maximum (that is, with the same display as for the measurement completion position (the screw position (S))) due to one cycle's worth of measurement being completed by automatic operation, for example. Hence, although differing from what is shown in FIG. 4, if the condition setting screen 35 is designed so that this real-time position display column 39a is disposed directly above the screw position display column 36, for example, then it will result in the screw position display column 36 being provided between the real-time position display column 39a and the VP switching position display column 39b, and will enable there to be achieved an improvement in ease-of-setting and visibility of the plurality of screw positions (1)-(5) displayed therebetween.

When the molded article has been extracted in step S105, presence/absence of a defect in the molded article, that is, whether the molded article is OK, is judged. Now, unless at least injection-and-filling from the screw position (S) being the measurement completion position to the VP switching position (E) (substantially full packing) is performed, the extracted molded article will not be formed with its intended shape in the test injection step. Therefore, at this stage, a defect is judged and a judgment result thereof received mainly referring to presence/absence of a molding defect such as resin burr of a region corresponding to the mold mating surface PL of a molded region or gas trapping in a filled region (step S106: judgment receiving step). In this judgment receiving step, there may be adopted a variety of judgment receiving methods such as the molded article being imaged and there being received a judgment result of presence/absence of a defect that has been automatically confirmed by image processing, or there being received a judgment result of presence/absence of a defect that the user has manually confirmed by visual observation, for example. Particularly, in order for variation in judgment by a confirmer to be suppressed in the manual confirmation by visual observation, of the latter, it is preferable that, regarding size (length, area, shape, thickness, and so on) of the resin burr of the region corresponding to the mold mating surface PL of the molded region, or regarding the molding defect such as gas trapping in the filled region, a judgment reference by which a defect is to be judged is expressed numerically or as an image. Moreover, if a judgment result of the molded article being OK has been received in the judgment receiving step (Yes in step S106), the setting unit 32 receives input to the effect of it being OK via the input unit 34, for example, and, as shown in FIG. 5, a second time of the test injection step is performed.

That is, in the second time of the test injection step, the screw position (2) next on the VP switching position side from the screw position (1) is selected, and setting made to advance the screw 24 to this selected screw position (2) (step S107), and, with the mold clamping force A maintained unchanged, processing shifts to above-described step S102 so that a second time of the short shot test injection step is performed. Then, the judgment receiving step of above-described step S106 is re-implemented.

In the example shown in FIG. 5, a judgment result of the molded article being OK is received in this second time of the judgment receiving step too (Yes in step S106). Hence, here, input information expressing a mold clamping force A the same as the arbitrary mold clamping force A at the screw position (1) of the screw 24 is inputted and displayed in the mold clamping force display column 37 in a manner associating it with the screw position (2).

Next, as shown in FIG. 5, a third time of the test injection step is performed. That is, in the third time of the test injection step, the screw position (3) next on the VP switching position side from the screw position (2) is selected, and setting made to advance the screw 24 to this selected screw position (3) (step S107), and, in a manner leaving the mold clamping force A maintained unchanged, processing shifts to above-described step S102 so that a third time of the short shot test injection step is performed, and the judgment receiving step of above-described step S106 is re-implemented.

In the example shown in FIG. 5, in this third time of the judgment receiving step, as indicated by "x" in the process of the screw 24 reaching the screw position (3) from the screw position (2), a judgment result of the molded article not being OK (the molded article having a defect and being no good) is received (No in step S106). That is, resin burr has been judged to have occurred due to the mold clamping force having been weak at the mold clamping force A in the process of reaching from screw position (2) to (3) in the third time of the test injection step (mold clamping force A<injected-and-filled area×molding resin pressure).

In this case, input information expressing the mold clamping force generated by the mold clamping device 10 at the screw position (2) prior on the measurement completion position side to the screw position (3) is inputted to the setting unit 32, via the input unit 34, by the user, so as to be increased from the mold clamping force A at a time of defect generation to a larger mold clamping force B (step S108), whereby, upon processing shifting to above-described step S101, the mold clamping force B (mold clamping force A<mold clamping force B) is inputted and displayed in an associated manner in the mold clamping force display column 37 corresponding to the screw position (2) of the screw position display column 36. Then, as shown in FIG. 5, a fourth time of the short shot test injection step is performed.

That is, in this fourth time of the test injection step, a configuration is adopted whereby, similarly to in the third time of the test injection step, the screw position (3) next on the VP switching position side from the screw position (2) is selected, and setting made to advance the screw 24 to this selected screw position (3) (step S107), but with the screw 24 being advanced while mold clamping is performed with the mold clamping force A maintained up to the screw position (2), and the screw 24 being advanced while mold clamping is performed at the mold clamping force B from the screw position (2) to the screw position (3).

Thus, with the mold clamping force at a certain position (screw positions (2)-(3)) during the injection advancing operation of the screw 24 being caused to increase stepwise from A to B, processing shifts to above-described step S102 so that a fourth time of the test injection step is performed, and the judgment receiving step of above-described step S106 is re-implemented.

In the example shown in FIG. 5, a judgment result of the molded article being OK is received in this fourth time of the judgment receiving step (Yes in step S106), so input information expressing a mold clamping force B the same as the arbitrary mold clamping force B at the screw position (2) of the screw 24 is automatically inputted to the setting unit 32 and displayed in the mold clamping force display column 37 in a manner associating it with the screw position (3).

Then, as shown in FIG. 5, a fifth time of the short shot test injection step is performed. That is, in the fifth time of the test injection step, the screw position (4) next on the VP switching position side from the screw position (3) is selected, and setting made to advance the screw 24 to the selected screw position (4) (step S107), and, in such a manner that the mold clamping force A will be maintained unchanged up to the screw position (2), and the mold clamping force B will be maintained unchanged from the screw position (2) to the screw position (4), processing shifts to above-described step S102 so that the fifth time of the test injection step is performed, and the judgment receiving step of above-described step S106 is re-implemented.

In the example shown in FIG. 5, a judgment result of the molded article being OK is received in this fifth time of the judgment receiving step too, similarly to in the fourth time (Yes in step S106), so input information expressing a mold clamping force B the same as the arbitrary mold clamping force B at the screw positions (2) and (3) of the screw 24 is automatically inputted to the setting unit 32 and (temporarily) displayed in the mold clamping force display column 37 in a manner associating it with the screw position (4).

Then, as shown in FIG. 5, a sixth time of the short shot test injection step is performed. That is, in the sixth time of the test injection step, the screw position (5) next on the VP switching position side from the screw position (4) is selected, and setting made to advance the screw 24 to this selected screw position (5) (step S107), and, in such a manner that the mold clamping force A will be maintained unchanged up to the screw position (2), and the mold clamping force B will be maintained unchanged from the screw position (2) to the screw position (5), processing shifts to above-described step S102 so that the sixth time of the test injection step is performed, and the judgment receiving step of above-described step S106 is re-implemented.

In the example shown in FIG. 5, in this sixth time of the judgment receiving step, as indicated by "x" in the process of the screw 24 reaching the screw position (5) from the screw position (4), a judgment result of the molded article not being OK (the molded article having a defect and being no good) is received (No in step S106). That is, resin burr has been judged to have occurred due to the mold clamping force having been weak at the mold clamping force B in the process of reaching from screw position (4) to (5) in the sixth time of the test injection step (mold clamping force B<injected-and-filled area×molding resin pressure).

In this case, input information expressing the mold clamping force generated by the mold clamping device 10 at the screw position (4) prior on the measurement completion position side to the screw position (5) is inputted to the setting unit 32, via the input unit 34, by the user, so as to be increased from the mold clamping force B at a time of defect generation to a larger mold clamping force C (step S108), whereby, upon processing shifting to above-described step S101, the mold clamping force C (mold clamping force B<mold clamping force C) is inputted and displayed in an associated manner in the mold clamping force display column 37 corresponding to the screw position (4) of the screw position display column 36. Then, as shown in FIG. 5, a seventh time of the short shot test injection step is performed.

That is, in this seventh time of the test injection step, a configuration is adopted whereby, similarly to in the sixth time of the test injection step, the screw position (5) next on the VP switching position side from the screw position (4) is selected, and setting made to advance the screw 24 to this selected screw position (5) (step S107), but with the screw 24 being advanced while mold clamping is performed with the mold clamping force A maintained up to the screw position (2), the screw 24 being advanced while mold clamping is performed with the mold clamping force B maintained from the screw position (2) to the screw position (4), and the screw 24 being further advanced while mold clamping is performed at the mold clamping force C from the screw position (4) to the screw position (5). Thus, with the mold clamping force being caused to increase stepwise from A to B, and from B to C, processing shifts to above-described step S102 so that a seventh time of the test injection step is performed, and the judgment receiving step of above-described step S106 is re-implemented.

In the example shown in FIG. 5, a judgment result of the molded article being OK is received in this seventh time of the judgment receiving step (Yes in step S106), so input information expressing a mold clamping force C the same as the arbitrary mold clamping force C at the screw position (4) of the screw 24 is automatically inputted to the setting unit 32 and displayed in the mold clamping force display column 37 in a manner associating it with the screw position (5).

Then, as shown in FIG. 5, an eighth time of the test injection step is performed. That is, in the eighth time of the test injection step, setting is made to advance the screw 24 to the VP switching position (the screw position (E)) next from the screw position (5) (step S107), and, in such a manner that the mold clamping force A will be maintained unchanged up to the screw position (2), the mold clamping force B will be maintained unchanged from the screw position (2) to the screw position (4), and the mold clamping force C will be maintained unchanged from the screw position (4) to the VP switching position, processing shifts to above-described step S102 so that the eighth time of the test injection step is performed, and the judgment receiving step of above-described step S106 is re-implemented.

Thus, the eighth time of the test injection step results in there being performed fully packing injection-and-filling in which the screw 24 is advanced from the screw position (S) being the measurement completion position to the VP switching position (E). Therefore, in the judgment receiving step of above-described step S106 in the eighth time of the test injection step, it is preferable that, in addition to there being confirmed presence/absence of a molding defect such as resin burr of a region corresponding to the mold mating surface PL of a molded region or gas trapping in a filled region, an entirety of the molded article is also confirmed, and that a general good/bad judgment of the molded article such as a judgment of presence/absence of a sink mark therein or judgment of a transfer state of a design surface thereof is thereby also performed. That is, in the plurality of times of the test injection step performed up to this point, to which screw position of the screw positions (1)-(5) each of certain regions of the molded article has undergone short shot filling has been clear, and, moreover, for each of the regions, the mold clamping force caused to act on the mold 4 has been clear. Moreover, if as a result of confirmation of the entire molded article having been performed, there has been confirmed a molding defect other than a molding defect such as resin burr or gas trapping in a filled region, or although being in a permissible range as a good article, there has been confirmed an item whose quality it is desired to improve further, then by this being utilized so that there is performed an increase/decrease (a resetting) of the mold clamping forces already associated with each of the screw positions (1)-(5), or performed a change to each of the already-set screw positions (1)-(5) or a resetting of the mold clamping forces associated with each of the post-change screw positions (1)-(5), and so that there is thereby performed an additional test injection step in a fully packed state advancing the screw 24 from the screw position (S) being the measurement completion position to the VP switching position (E), there may be expected a resolution of the confirmed molding defect or improvement in quality of the molded article. Note that sometimes there is a difference between the hitherto-described test injection step and molding conditions in actual continuous manufacturing (molding), and sometimes, due to mold temperature by continuous manufacturing (molding) or temperature change of molding material, an injection-and-filling state differs slightly from in the test injection step. In view of these possible differences, it is preferable that molding confirmation in the continuous manufacturing (molding) is performed a certain number of times combining normal molding conditions and control of mold clamping forces set associated with the screw positions in the test injection step described above, and that, as required, there is performed an increase/decrease (a resetting) of the mold clamping forces already associated with each of the screw positions (1)-(5), or performed a change to each of the already-set screw positions (1)-(5) or a resetting of the mold clamping forces associated with each of the post-change screw positions (1)-(5).

In the example shown in FIG. 5, a judgment result of the molded article being OK is received in this eighth time of the judgment receiving step (Yes in step S106), so input information expressing a mold clamping force C the same as the arbitrary mold clamping force C at the screw positions (4) and (5) of the screw 24 is automatically inputted to the setting unit 32 and (temporarily) displayed in the mold clamping force display column 37 in a manner associating it with the VP switching position (the screw position (E)).

Note that the mold clamping force at the VP switching position may be the maximum mold clamping force M for pressure-keeping, hence if this mold clamping force M for pressure-keeping is larger than the mold clamping force C (mold clamping force C<mold clamping force M), then the mold clamping force at the VP switching position is automatically changed from C to M by the setting unit 32 to have M associated with it, and, as shown in FIG. 5, is displayed in the mold clamping force display column 37 corresponding to the VP switching position (the screw position (E)). Moreover, in a mode where, as previously described, the mold clamping force at the VP switching position (the maximum mold clamping force M for pressure-keeping) is inputted as basic input information by an injection condition setting screen or molding condition setting screen for actual production, for example, separate from the condition setting screen 35, the mold clamping force at the VP switching position that has been inputted by these setting screens may be read from the setting unit 32 to be displayed in (E) of the mold clamping force display column 37 in the same line as the VP switching position display column 39b.

In the control device 30, the molding conditions are set by the setting unit 32, based on the information that has been thus displayed in each of the display columns 36, 37, 38, 39a, 39b of the condition setting screen 35 of the display unit 31. Moreover, by operation of the mold clamping device 10 and injection device 20 being controlled by the control unit 33 based on the set molding conditions, injection molding by the injection molding machine 1 is performed.

Thus, the method of setting a mold clamping force of the present embodiment enables suitable mold clamping forces (mold clamping forces preventing occurrence of a defect, that as far as possible are smaller than the maximum mold clamping force M) at each of the screw positions (1)-(5) of the screw 24 in the injection advancing operation to be determined and mold clamping conditions included in molding conditions set, by trial-and-error.

Hence, if the control device 30 of the injection molding machine 1 and method of setting a mold clamping force according to the present embodiment are employed, mold clamping forces by the mold clamping device 10 that are appropriate to behavior of the screw 24 in relation to injection-and-filling of the injection device 20, are optimally set. As a result, occurrence of resin burr of a region corresponding to the mold mating surface PL of the mold 4 can be suppressed and degassing of the inside of the cavity 5 from the mold mating surface PL of the mold 4 favorably performed with improved degassing efficiency, and it becomes possible for molding defects of the molded article to be reduced.

Moreover, due to there being optimally set mold clamping forces by the mold clamping device 10 that are appropriate to behavior of the screw 24 in relation to injection-and-filling of the injection device 20, it becomes possible for history of mold clamping force (mold clamping force×mold clamping time) acting on the mold 4 to be reduced and life of the mold 4 thereby extended, compared to in operation of an injection molding machine under conventional mold clamping force control where the mold is acted on by the maximum mold clamping force from start of injection-and-filling to completion of pressure-keeping.

Moreover, since a stepwise mold clamping by the mold clamping device 10 and a simultaneous/parallel operation of injection by the injection device 20 can be realized, it becomes possible for shortening of an injection molding cycle to be achieved and for cycle time to be shortened. Furthermore, since resistance of residual gas within the cavity 5 can be lowered (since resin pressure during injection-and-filling can be lowered), a scaling-down of the mold clamping force (a scaling-down of the injection molding machine 1) can be achieved, and downsizing of molding-related equipment realized. Moreover, since heat generation associated with compression of gas can be reduced too by residual gas within the cavity 5 being reduced, a cooling time of the material-for-molding 22 (molten resin, or the like) can be shortened, and a shortening of the injection molding cycle realized.

While certain embodiments have been described, these embodiments have been presented by way of example only, and are not intended to limit the scope of the inventions. Indeed, the novel methods and systems described herein may be embodied in a variety of other forms: furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

DESCRIPTION OF REFERENCE NUMERALS 1 injection molding machine
2 fixed mold
3 movable mold
4 mold
5 cavity 10 mold clamping device
11 fixed platen
12 movable platen
13 link housing
14 toggle link mechanism
19 tie bar
20 injection device
21 nozzle
22 material-for-molding
23 hopper
24 screw
25 injection mechanism
26 rotation mechanism
30 control device
31 display unit
32 setting unit
33 control unit
34 input unit
35 condition setting screen
36 screw position display column
37 mold clamping force display column
38 mold closing speed display column
39a real-time position display column
39b VP switching position display column

The invention claimed is:

1. A control device of an injection molding machine, the injection molding machine comprising: a mold clamping device that advances and retracts a movable mold with respect to a fixed mold; and an injection device that injects and fills a molten material into a cavity formed between both of the molds, the control device comprising:
a display unit that displays a setting screen for setting molding conditions of the injection molding machine; and
a setting unit that sets the molding conditions based on information displayed on the setting screen,
the setting screen having: a first display column that displays a plurality of screw positions from a measurement completion position of a screw of the injection device to a pressure-keeping switching position of the screw of the injection device; and a second display column that displays mold clamping forces generated by the mold clamping device in such a manner that the mold clamping forces are associated with the plurality of screw positions displayed in the first display column,
the control device being configured to execute the following processing of (a) to (d):
(a) a first setting processing in which the plurality of screw positions from the measurement completion position of the screw to the pressure-keeping switching position of the screw are displayed in the first display column to be set;
(b) a second setting processing in which setting is performed in such a manner that a screw position that has been selected, in order from a measurement completion position side, from the plurality of screw positions that have been set, is associated with the mold clamping force displayed in the second display column;
(c) an injection processing in which mold clamping is performed with the mold clamping force that has been set, and the screw is advanced to the selected screw position from the measurement completion position to have the molten material filled into the cavity; and
(d) a judgment receiving processing in which a molded article that has been extracted from the cavity after the injection processing receives a judgment result of presence/absence of a defect, and
the mold clamping force in the molding conditions being set by repeating, for each of the plurality of screw positions, the following steps:
when the defect has been found to be present in the molded article in the judgment receiving processing of above-described (d), the set mold clamping force associated with the screw position where the defect has been confirmed is displayed and increased in the second setting processing of above-described (b), and
the injection processing of above-described (c) and the judgment receiving processing of above-described (d) are re-performed for the screw position where the defect has been confirmed.

2. The control device of an injection molding machine according to claim 1, wherein
the mold clamping force of the molding conditions is set so as to become larger stepwise from the measurement completion position to the pressure-keeping switching position.

3. The control device of an injection molding machine according to claim 1, wherein
the setting unit sets the molding conditions in such a manner that the screw position set to the measurement completion position, of the plurality of screw positions is associated with an initial mold clamping force of a start time of injection by the injection device.

4. The control device of an injection molding machine according to claim 1, wherein
the setting unit sets the molding conditions in such a manner that the screw position set to the pressure-keeping switching position, of the plurality of screw positions is associated with a mold clamping force for pressure-keeping by the mold clamping device.

5. A control device of an injection molding machine, the injection molding machine comprising: a mold clamping device that advances and retracts a movable mold with respect to a fixed mold; and an injection device that injects and fills a molten material into a cavity formed between both the molds, the control device comprising:
a display unit that displays a setting screen for setting molding conditions of the injection molding machine; and
a setting unit that sets the molding conditions based on information displayed on the setting screen,
the setting screen having: a first display column that displays a plurality of screw positions from a measurement completion position of a screw of the injection device to a pressure-keeping switching position of the screw of the injection device; and a second display column that displays mold clamping forces generated by the mold clamping device in such a manner that the mold clamping forces are associated with the plurality of screw positions displayed in the first display column,
the setting unit setting the molding conditions in such a manner that each of the plurality of screw positions displayed in the first display column is associated with the mold clamping force displayed in the second display column as a mold clamping force to be generated when the screw has reached the screw position, wherein
the setting screen has a third display column that displays a mold closing speed of the mold clamping device, and
the setting unit sets the molding conditions in such a manner that each of the mold clamping forces respectively associated with the plurality of screw positions is associated with the mold closing speed at a time when the mold clamping force thereof displayed in the third display column is generated.

6. The control device of an injection molding machine according to claim 1, wherein
the setting screen has a fourth display column that displays a real-time screw position of the screw.

7. The control device of an injection molding machine according to claim 1, wherein
the setting screen has a fifth display column that displays the screw position set to the pressure-keeping switching position of the screw.

8. The control device of an injection molding machine according to claim 7, comprising:
an input unit that receives input of information to at least one of the first display column, the second display column, and the fifth display column in the setting screen; and
a control unit that controls operation of at least one of the mold clamping device and the injection device based on the molding conditions set by the setting unit.

9. A method of setting a mold clamping force of a mold clamping device using a control device, wherein
the control device is a control device of an injection molding machine which comprises:
the mold clamping device that advances and retracts a movable mold with respect to a fixed mold; and an injection device that injects and fills a molten material into a cavity formed between both the molds,
the control device has a display unit that displays a setting screen for setting molding conditions of the injection molding machine; and a setting unit that sets the molding conditions based on information displayed on the setting screen, and
the setting screen has a first display column that displays a plurality of screw positions from a measurement completion position of a screw of the injection device to a pressure-keeping switching position of the screw of the injection device; and a second display column that displays mold clamping forces generated by the mold clamping device in such a manner that the mold clamping forces are associated with the plurality of screw positions displayed in the first display column,
the method of setting the mold clamping force comprising:
(a) a first setting step in which the plurality of screw positions from the measurement completion position of the screw to the pressure-keeping switching position of the screw are displayed in the first display column to be set;
(b) a second setting step in which setting is performed in such a manner that a screw position that has been selected, in order from a measurement completion position side, from the plurality of screw positions that have been set, is associated with the mold clamping force displayed in the second display column;

(c) an injection step in which mold clamping is performed with the mold clamping force that has been set, and the screw is advanced to the selected screw position from the measurement completion position to have the molten material filled into the cavity; and
(d) a judgment receiving step in which a molded article that has been extracted from the cavity after the injection step receives a judgment result of presence/absence of a defect,
the mold clamping force in the molding conditions being set by repeating, for each of the plurality of screw positions, the following steps:
when the defect has been found to be present in the molded article in the judgment receiving step of above-described (d), the set mold clamping force associated with the screw position where the defect has been confirmed is displayed and increased in the second setting step of above-described (b), and
the injection step of above-described (c) and the judgment receiving step of above-described (d) are re-performed for the screw position where the defect has been confirmed.

10. The method of setting a mold clamping force according to claim 9, wherein
the mold clamping force in the molding conditions is set by the molding clamping force being repeated for each of the plurality of screw positions that when a defect has not been found to be present in the molded article in the judgment receiving step of above-described (d), the mold clamping force that is set associated with a screw position where a defect has not been confirmed is displayed and set in the second setting step of above-described (b) with respect to a next screw position more to a pressure-keeping switching position side than that screw position, whereupon the injection step of above-described (c) and the judgment receiving step of above-described (d) are performed for the next screw position.

11. The method of setting a mold clamping force according to claim 9, wherein
the control device controls the mold clamping device and the injection device to automatically have performed as one cycle that
in the first setting step of above-described (a), one screw position of the plurality of screw positions is displayed in the first display column to be set as the pressure-keeping switching position,
in the second setting step of above-described (b), the one screw position is set to be associated with the mold clamping force displayed in the second display column as a selected screw position, and
in the injection step of above-described (c), the screw is advanced to the one screw position to have filling with the molten material performed.

\* \* \* \* \*